United States Patent [11] 3,533,514

[72] Inventors Ralph V. Kellinger
Van Nuys;
Harvey G. Wilhelm, La Crescenta,
California
[21] Appl. No. 680,249
[22] Filed Nov. 2, 1967
[45] Patented Oct. 13, 1970
[73] Assignee Lockheed Aircraft Corporation
Burbank, California

[54] EXTENSION ARM
3 Claims, 2 Drawing Figs.

[52] U.S. Cl. ................................................. 211/183
[51] Int. Cl. ................................................. A47f 5/00
[50] Field of Search ................................................. 182/229,
113, 114, 222; 214/16.4; 211/13, 605, 183;
248/210(Cursory)

[56] References Cited
UNITED STATES PATENTS
2,164,973 7/1939 Webster ................. 182/229X
2,541,434 2/1951 Nelson et al. ................. 248/210
2,875,902 3/1959 Ayars ................. 211/13
2,957,583 10/1960 Busbridge ................. 214/16.4X
2,966,228 12/1960 Kowalski et al. ................. 182/229X
3,120,878 2/1964 Neeley ................. 182/229X Primary Examiner—Reinaldo P. Machado
Assistant Examiner—Andrew V. Kundrat
Attorney—George C. Sullivan ABSTRACT: A removable extension arm for storage racks to facilitate the loading and unloading and storage of elongated stock. The extension arm is of generally rectangular cross section and defines an open ended chamber along its length adapted to receive the arm from a conventional storage rack. An end plate covers one end of the chamber and extends upward beyond the top plate so as to act as a barricade for the bar stock. The bottom plate is longer in length than the top plate, thereby adding greater structural rigidity for withstanding the moment forces exerted by the stored material stock. Registered apertures in the top and bottom plates, when in alignment with the hole in the rack arm, permit the insertion of a locking pin to removably secure the extension arm to the storage rack.

INVENTORS.
RALPH V. KELLINGER
HARVEY G. WILHELM
BY

*George C. Sullivan*
Agent

3,533,514

EXTENSION ARM

BACKGROUND OF THE INVENTION

1. Field of the Invention

This invention relates in general to an extension arm and more particularly to a removably mounted extension arm for storage racks adapted to retain bar stock and permit its removal by an overhead crane or the like.

2. Description of the Prior Art

Heretofore, the storage of bar stock has necessitated facilities in which the aisleways between the storage racks were sufficiently large to accommodate forklifts or other similar mechanized carrier means. Such aisleways were required since overhead cranes or carriers could not be utilized as bar stock and comparable materials are usually stored in layers, one beneath the other. Consequently, it became necessary to use forklifts so that when removal of stock was desired, the forklift was driven down the aisleway, turned so that it faced the bar stock, and thereupon moved forward until the fork was inserted beneath the stock. This removal process was not only economically disadvantageous, but greatly lessened the amount of materials which could be stored in any given area.

More recently, storage racks having extensible arms have been developed. These racks, however, are likewise economically disadvantageous since each arm is extensible and utilizes rollers or bearings even though the stock on any given arm may not be removed for several months or even years.

SUMMARY OF THE INVENTION

The disadvantages of the prior art have been overcome by the novel extension arm of the present invention which can be removably mounted to conventional storage rack arms. The extension arm comprises structurally connected plates defining an open ended chamber, the interior of which is adapted to receive an arm of the rack. An end plate, disposed opposite the rack extends beyond the top plate and acts to barricade stock resting on the arm. Registered apertures in the top and bottom plates, when aligned with a hole in the rack arm, permit securing of the rack to the extension arm via a locking pin disposed therethrough. Chamfering of the top plate permits bar stock to be moved or rolled upon the extension arm without the necessity of lifting it by mechanized means.

It is therefore an object of the invention to provide an extension arm for storage racks which may be removably mounted thereto.

Another object of the present invention is to provide a removably mounted extension arm for storage racks which is adapted to permit utilization of an overhead crane or the like for storing or removing bar stock or other materials.

Another object of the invention is to provide an extension arm for storage racks which is economical in construction and which is adapted to accommodate heavy loads.

The novel features which are believed to be characteristic of the invention are set forth with particularity in the appended claims. The invention itself, however, can best be understood by reference to the following description taken in connection with the accompanying drawings.

It should, of course, be understood that the description and drawings herein are illustrative merely and that various modifications and changes may be made in the mechanism shown without departing from the spirit of the invention.

DESCRIPTION OF THE PREFERRED EMBODIMENT

Figure 1:
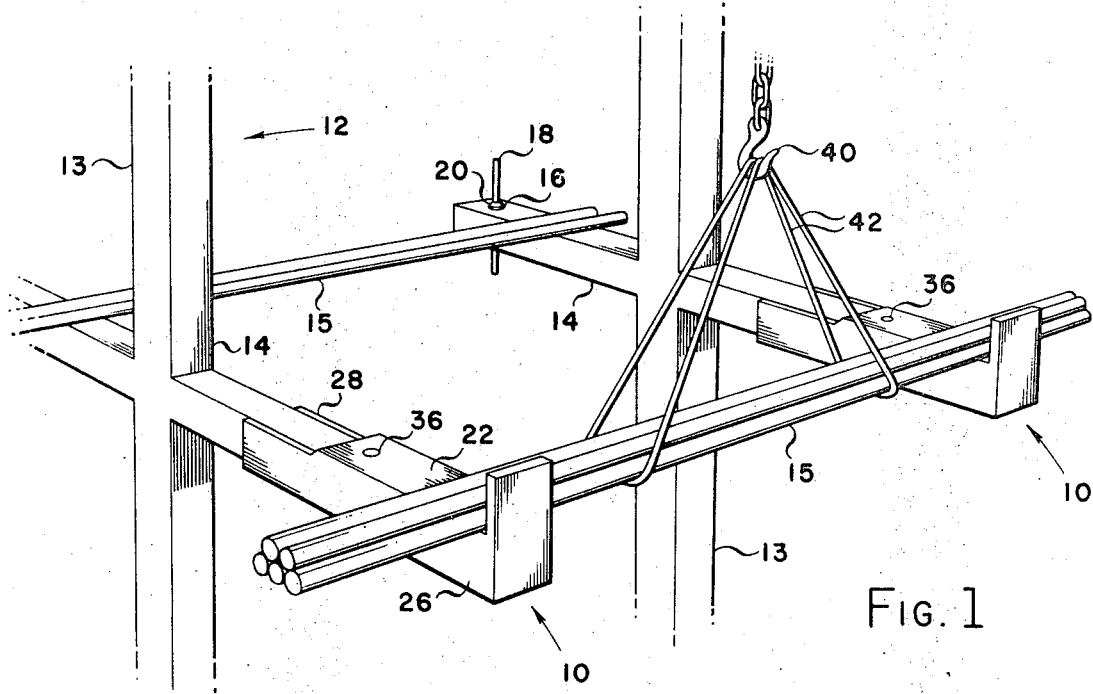
FIG. 1 is a perspective view of the novel extension arm of the present invention and is shown as being removably mounted to a storage rack and further illustrates bar stock resting thereon.

Referring now to the drawings and more particularly to FIG. 1 thereof, an extension arm generally indicated in the direction of the numeral 10 is shown as being removably mounted upon a storage rack 12. The storage rack 12 includes a plurality of vertical trunks 13, each having a plurality of outwardly extending branches or arms 14 fixedly secured thereto. The trunks 13 are attached to one another by means of a base (not shown) such that each row of arms is in substantial alignment. The arms 14 are disposed at a slight upward angle from the horizontal to prevent bar stock 15 mounted thereon from rolling off. A hole 16 through the arm 14 is adapted to receive a substantially vertically oriented pin 18. When the pin 18 is inserted into the hole 16 a flange 20 disposed about the periphery and forming a part of the pin 18 rests upon the top surface of the arm 14 to act as a detent and to aid in preventing accidental dislocation of the bar stock 15.

Figure 2:
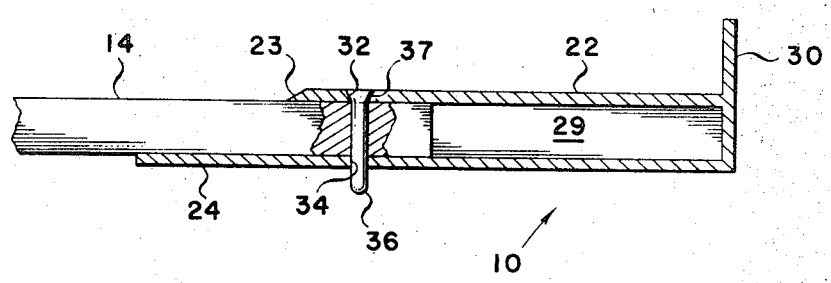
FIG. 2 is a sectional side view of the extension arm of FIG. 1 and is shown as being secured to the storage rack arm (partially cut away) by means of a locking pin.

The extension arm 10, as best shown in FIG. 2, includes a top plate 22 having a chamfered edge 23 and a bottom plate 24 which are secured to one another by means of intermediately disposed sides 26 and 28. The top plate 22 and the bottom plate 24 and the sides 26 and 28 define an open ended chamber 29 which is adapted to receive the extension arm 14. An end plate 30 is fixedly secured to the top and bottom plates 22 and 24, respectively, and to the sides 26 and 28. It extends beyond the top plate 22 such that it forms a stop or barricade. The top plate 22 includes an aperture 32 therethrough and the bottom plate 24 likewise includes an aperture 34 which is in register with the aperture 32. When the extension arm 10 is mounted to the rack arm 14 apertures 32 and 34, when aligned with the hole 16, permit the insertion of a locking pin 36 having a countersunk head portion 37.

In operation, then, the novel invention works in the following manner. When stock 15, stored on the rack 12, is desired to be removed, pins 18 are first withdrawn from the rack arms 14. The extension arm 10 is thereupon positioned over the rack arm 14 and secured in place by means of insertion of the locking pin 36 through apertures 32 and 34 and the hole 16. The stock 15 is then either manually or with the assistance of an overhead crane 40 and cables 42 moved horizontally onto the arm 10. Because the bottom plate 24 extends well beyond the pin 36, towards the trunk 13, the weight of the stock 15 and the force moment exerted thereby is taken up over a large area. The stock 15 is thereafter removed, and the arm 10 disengaged and pin 18 reinserted.

In this manner stock or rod may be easily removed from storage racks without the necessity of utilizing forklifts, or costly built-in extension arms.

We claim:

1. In combination with a storage rack having a base, upwardly extending support means affixed to the base, and a plurality of rack arms extending substantially horizontally from the upwardly extending support means, the ends of the rack arms opposite the support means being free, each rack arm having an aperture therethrough, an extension arm upon the free end of each of a plurality of the rack arms comprising:
    a top plate having a countersunk aperture therethrough;
    a bottom plate substantially parallel to the top plate and having an aperture therethrough in register with the apertures of the top plate and the rack arm;
    first and second sides in spaced parallel relation and secured to and disposed between the top and bottom plates;
    an end plate secured with respect to the top and bottom plates and the first and second sides, the end plate extending above the top plate; and
    locking means, said locking means being a pin having a countersunk head and disposed through the registered apertures for mounting the extension arm to the rack arm.

2. In combination with a storage rack having a base, upwardly extending support means affixed to the base, and a plurality of rack arms extending substantially horizontally from the upwardly extending support means, the ends of the rack arms opposite the support means being free, each rack arm having an aperture therethrough, an extension arm upon the free end of each of a plurality of the rack arms comprising:
- a top plate having an aperture therethrough;
- a bottom plate substantially parallel to the top plate and having an aperture therethrough in register with the apertures of the top plate and the rack arm, said bottom plate being substantially longer in length than the top plate;
- first and second sides in spaced parallel relation and secured to and disposed between the top and bottom plates;
- an end plate secured with respect to the top and bottom plates and the first and second sides, the end plate extending above the top plate; and
- locking means disposed through the registered apertures for mounting the extension arm to the rack arm.

3. In combination with a storage rack having a base, upwardly extending support means affixed to the base, and a plurality of rack arms extending substantially horizontally from the upwardly extending means, the ends of the rack arms opposite the support means being free, each rack arm having an aperture therethrough, an extension arm upon the free end of each of a plurality of the rack arms comprising:
- a top plate with first and second ends, said first end being chamfered and said plate having an aperture therethrough;
- a bottom plate substantially parallel to the top plate and having an aperture therethrough in register with the apertures of the top plate and the rack arm;
- first and second sides in spaced parallel relation and secured to and disposed between the top and bottom plates;
- an end plate secured to the second end of the top plate and to the bottom plate and the first and second sides, the end plate extending above the top plate; and
- locking means disposed through the registered apertures for mounting the extension arm to the rack arm.